US007447217B2

United States Patent
Knaebchen

(10) Patent No.: US 7,447,217 B2
(45) Date of Patent: Nov. 4, 2008

(54) METHOD FOR ESTABLISHING A COMMUNICATION LINK BETWEEN SUBSCRIBER STATIONS OF A SWITCHING SYSTEM WHICH COMPRISES TWO COMMUNICATION NETWORKS

(75) Inventor: Andreas Knaebchen, München (DE)

(73) Assignee: Siemens Aktiengellschaft, Munich (DE)

( * ) Notice: Subject to any disclaimer, the term of this patent is extended or adjusted under 35 U.S.C. 154(b) by 572 days.

(21) Appl. No.: 10/492,149

(22) PCT Filed: Oct. 1, 2002

(86) PCT No.: PCT/EP02/11018

§ 371 (c)(1),
(2), (4) Date: Apr. 9, 2004

(87) PCT Pub. No.: WO03/034703

PCT Pub. Date: Apr. 24, 2003

(65) Prior Publication Data

US 2004/0246968 A1   Dec. 9, 2004

(30) Foreign Application Priority Data

Oct. 12, 2001  (EP)  .................................. 01124526

(51) Int. Cl.
*H04L 12/28* (2006.01)
(52) U.S. Cl. .................. 370/401; 370/522; 370/352
(58) Field of Classification Search ............... None
See application file for complete search history.

(56) References Cited

U.S. PATENT DOCUMENTS

| 4,764,919 | A  |   | 8/1988  | Hunter et al. |
| 6,205,135 | B1 |   | 3/2001  | Chinni et al. |
| 6,292,553 | B1 |   | 9/2001  | Fellingham et al. |
| 6,671,367 | B1 | * | 12/2003 | Graf et al. .................... 379/229 |
| 6,683,877 | B1 | * | 1/2004  | Gibbs et al. .............. 370/395.2 |
| 6,754,180 | B1 | * | 6/2004  | Christie ...................... 370/236 |
| 6,766,377 | B1 | * | 7/2004  | Grabelsky et al. ........... 709/238 |
| 6,876,646 | B1 | * | 4/2005  | Dore et al. .................. 370/352 |

(Continued)

FOREIGN PATENT DOCUMENTS

EP     0 905 959 A2    3/1999

(Continued)

*Primary Examiner*—Bob A Phunkulh
(74) *Attorney, Agent, or Firm*—Bell, Boyd & Lloyd LLP

(57) ABSTRACT

In a switching system, the subscriber stations of which are linked to a switching centers of a first communication network, which are connected to each other through a second communication network, such as the internet, by means of transition devices, with which separate control devices are associated to control the connection traffic as a function of control and/or signaling information. A communication connection is established to a subscriber station to be called, the availability of which has changed from one switching center to another switching center, by first setting up a signaling connection to the switching center at which the subscriber station to be called was hitherto available, whereupon a communication connection is established using the control and/or signaling information specifying the changed availability of the subscriber station to be called directly to the other switching center at which the subscriber station to be called is now available, via the transition device connecting this switching center to the second communication network.

4 Claims, 1 Drawing Sheet

U.S. PATENT DOCUMENTS

| | | | |
|---|---|---|---|
| 6,944,166 B1 * | 9/2005 | Perinpanathan et al. | 370/401 |
| 7,046,669 B1 * | 5/2006 | Mauger et al. | 370/393 |
| 7,051,083 B1 * | 5/2006 | Graf et al. | 709/218 |
| 7,054,273 B1 * | 5/2006 | Scholtens et al. | 370/248 |
| 7,054,325 B1 * | 5/2006 | Archibald | 370/410 |
| 7,194,071 B2 * | 3/2007 | Rupsis | 379/88.16 |
| 2001/0036176 A1 * | 11/2001 | Girard | 370/352 |
| 2002/0027983 A1 * | 3/2002 | Suzuki | 379/229 |

FOREIGN PATENT DOCUMENTS

| | | |
|---|---|---|
| WO | WO 97/28628 | 8/1997 |

* cited by examiner

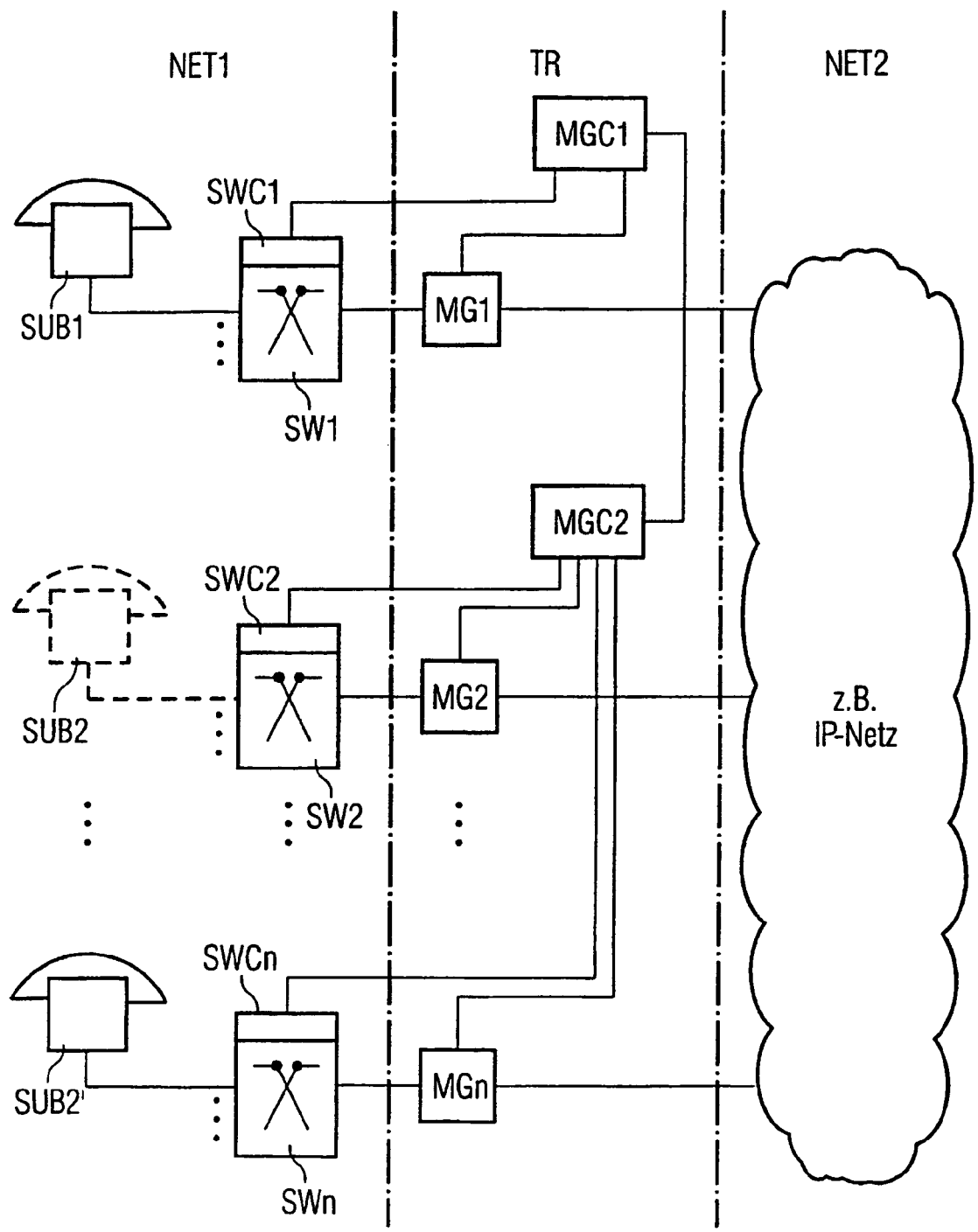

METHOD FOR ESTABLISHING A COMMUNICATION LINK BETWEEN SUBSCRIBER STATIONS OF A SWITCHING SYSTEM WHICH COMPRISES TWO COMMUNICATION NETWORKS

CLAIM FOR PRIORITY

This application claims priority to International Application No. PCT/EP02/11018, which was published in the German language on Apr. 24, 2003, which claims the benefit of priority to European Application No. 01124526.3 which was filed in the German language on Oct. 12, 2001.

TECHNICAL FIELD OF THE INVENTION

The invention relates to a method for establishing a communication connection between calling subscriber stations and subscriber stations to be called.

BACKGROUND OF THE INVENTION

An IP network here refers to a switching and transmission network, in which communication signals are switched or transmitted on the basis of an internet protocol.

Switching network configurations of the type mentioned above will in future supplement or even supersede conventional communication networks, such as time-multiplex switching networks. In the transition devices between the switching centers of the first communication network and the second communication network according to the respective network conditions. If the first communication network is a time-multiplex switching network, such as the communication network deployed commercially under the name EWSD, and if the second communication network is for example a packet switching network, such as an IP network, it is necessary to effect the conversion from time-multiplex signals to packet signals and vice-versa from packet signals to time-multiplex signals in the transition devices between the switching centers of the first communication network and the second communication network respectively. This means that in the event of a communication connection between a calling subscriber station linked to a switching center of the first communication network and a subscriber station to be called also linked to a switching center of the first communication network, in particular another switching center of the relevant first communication network, a dual signal conversion is required based on the signal conversions considered above. This requires a relatively high conversion capacity and therefore computer capacity in the transition devices provided between the relevant switching centers of the first communication network and the second communication network, the transition devices generally being computer-controlled, in order to achieve the fastest possible conversions of the communication signals. Such fast conversions of communication signals are necessary so that the delays in the forwarding of communication signals resulting from the relevant conversions are not perceived as disruptive and detrimental to the quality of the respective communication connection.

In addition to the problem highlighted above, a further, in some cases more serious, problem also occurs in the event of call forwarding or call redirection in respect of a subscriber station to be called. With such call redirection a communication connection is first set up in the conventional manner to the switching center, at which the subscriber station to be called was hitherto available, and a redirection communication connection is then set up from this switching center to the switching center at which the relevant subscriber station to be called is now available. However, given the switching system configuration considered above, this means that in addition to the conversion processes considered above, further conversion processes also have to be implemented in respect of the communication signals to be transmitted in each instance between the calling subscriber station and the subscriber station to be called. However this is associated with marked delay times and therefore also a deterioration in quality during transmission of the respective communication signals between the calling subscriber station and the subscriber station to be called.

These delay times result primarily from packet assembly and disassembly processes due to the transitions between the switching networks. Given a typical packet assembly or disassembly time of between 10 and 30 ms and a delay threshold value of around 100 ms due to the sensitivity of human hearing in respect of sound delays, an n-fold conversion of communication signals, by which the resulting overall delay time due to conversion exceeds the said threshold value, is no longer perceived as tolerable.

With regard to the delay threshold value just mentioned, it should also be taken into account that sections subject to a high level of delay may be included during the course of the respective communication connection, such as one or a plurality of mobile radio links or a satellite link.

Several documents are known from the state of the art to resolve the problem:

In EP 0 905 959 A2, "A packet switched network telephone system", dated 31 Mar. 1999 a telephone system is also disclosed, with which a connection can be switched between two telephones via a packet switching network by exchanging network addresses. The system also allows a number of additional services, such as callback, call forwarding, call waiting and many more. In the case of call forwarding for example a source switching node, to which the calling telephone is linked, attempts to set up a connection to a called telephone, unaware that call forwarding is stored for this called telephone. As a result the new call number is sent from the destination switching node to which the telephone to be called is linked, to the source switching node, which then sets up a direct connection to the new call destination.

Also in U.S. Pat. No. 4,764,919, "Virtual PBX call processing method", dated 16 Aug. 1988 a group of users in a packet data network is given access to a virtual PBX functionality. The user stations thereby exchange signaling information via virtual connections and process this information, to implement call control. Services such as call forwarding or automatic callback are thereby implemented without the assistance of the packet data network. With call forwarding a source user station attempts to set up a connection to a destination user station, unaware that call forwarding is stored for this user station. As a result the new call address is sent from the destination user station to the source user station, which then sets up a direct connection to the new user station.

In this context WO 00/31933, "Voice over data telecommunications network architecture", dated Feb. 6, 2000 is also of interest, describing a system and a method for voice and data transmission via a packet switching network, which exists in parallel to a conventional PSTN network and communicates with this. The system allows the packet switching of voice and data connections from and to every local network operator, a user terminal device or a data network.

In U.S. Pat. No. 6,292,553, "Method and apparatus for IP network call delivery", dated 18 Sep. 2001 a method is also disclosed, with which a caller can only set up a connection to another subscriber via an IP network by dialing the latter's number. On receipt of a request for a call to be set up, a network accesses a database, which contains control commands for route control. If an appropriate entry is found in the database for what is known as a call attribute, the call is routed according to the control commands, if necessary also via the IP network, if this is specified.

U.S. Pat. No. 6,205,135, "Access platform for internet based telephony", dated 20 Mar. 2001 also discloses an alternative access platform, which is linked to the internet, a local network operator and other communication devices. A user thereby sets up an internet connection for example or even a POTS connection to the access platform. The connection is routed according to a profile assigned to a user, independently of this.

Finally, WO 97/28628, "Hybrid network for real-time phone-to-phone communications", dated Jul. 8, 1997 a method and a system are disclosed that allow a subscriber in a conventional telephone network to make long-distance calls via a packet switching data network, to save on call charge costs. To make a long-distance call the sub-scriber only has to specify the address of a source server and the destination call number. The source server then determines the destination server to which the connection should be set up. The destination server then dials the destination call number and sets up the connection between the calling parties.

SUMMARY OF THE INVENTION

The invention relates to a method for establishing a communication connection between calling subscriber stations and subscriber stations to be called, whereby the subscriber stations are linked to switching centers of a first communication network, in particular a time-multiplex switching network, whereby the switching centers are connected to each other by means of transition devices through a second communication network, in particular a packet switching network, such as an IP network, whereby the transition devices are assigned separate control devices, which control connection traffic via the transition devices assigned to them and whereby a call redirection to another subscriber station at another switching center is stored for a sub-scriber station to be called at one switching center.

The invention discloses a particularly simple way of switching a connection from a calling subscriber station to a subscriber station to be called, for which a call redirection to another subscriber station is stored.

In one embodiment of the invention, there is a method:

with which during the course of a signaling connection to the subscriber station to be called, a first control and or signaling information element comprising the call numbers of the calling subscriber station and the subscriber station to be called is stored in the control devices which are included in this signaling connection, with which the control device receives a second control and/or signaling information element supplied by the switching center, which is connected to the control device and at which the relevant subscriber station to be called was hitherto available, about the switching center at which the relevant subscriber station to be called is now available, with which this control device identifies the existence of a call redirection situation from a comparison of the first and second control or signaling information elements, and with which the communication connection to this other switching center is set up from the control device using the second control and/or signaling information element directly via the transition device which connects the switching center to the second communication network.

This has the advantage, on the one hand, that in the event of call forwarding to a subscriber station to be called the communication signals are subject to the same number of conversion processes between the first communication network and the second communication network, as in the case of a regular connection between two sub-scriber stations, and on the other hand, that a relatively simple and reliable signaling procedure can be used to establish the communication connection between the calling subscriber station and the subscriber station to be called. Existing standard devices, which are deployed for setting up communication connections in the respective switching network, can be used for this signaling procedure in the individual switching networks.

The signaling connection between the switching center to which the calling subscriber station is linked, and the switching center at which the subscriber station to be called was hitherto available, is expediently set up via control devices, which on the one hand, are connected to the relevant switching centers and the transition devices connected to these and, which on the other hand, are connected to each other. This advantageously allows signaling connections between calling subscriber stations and subscriber stations to be called to be established in a particularly flexible manner within the overall switching system. Existing standard devices, which are deployed for setting up communication connections in the respective switching network, can thereby be used in the individual switching networks.

The respective signaling connection between the respective calling subscriber station and the subscriber station to be called in each instance is expediently processed in a corresponding manner to the respective communication connection between the relevant subscriber stations. This has the advantage that, after identification of a call redirection situation in respect of the sub-scriber station to be called, a signaling connection no longer has to be routed via the switching center of the first communication network at which the sub-scriber station to be called was hitherto available, thereby alleviating the signaling processing load.

The control or signaling information stored in the control devices of the transition devices involved in the respective connection is preferably deleted after termination of the communication connection between the sub-scriber stations connected to each other in each instance. This ensures that no unnecessary information or data remains in the control devices after termination of the respective communication connection.

BRIEF DESCRIPTION OF THE DRAWINGS

The invention is described in more detail below with reference to the drawing, in which:

FIG. 1 shows an exemplary switching system having two different communication networks which are connected to each other via a transition area.

DETAILED DESCRIPTION OF THE INVENTION

Associated with the switching system shown in the drawing is a first communication system NET1, which may for example be a time-multiplex switching system, such as the EWSD system in commercial use. This first communication network NET1 has a plurality of switching centers SW1, SW2 to SWn, which are equipped with their own control devices SWC1, SWC2 to SWCn (only shown diagrammatically here). These control devices SWC1 to SWCn are used both to select the respective switching center as a function of control and/or signaling information, in particular dialing information, from subscriber stations which are linked to the respective switching center, and to receive and forward such control and/or signaling information from or to the transition area TR shown in the drawing.

Linked to the switching centers SW1 to SWn of the first communication network NET1 is a plurality of subscriber stations, which may include telephone subscriber terminals, fax machines, data terminals, PCs or other communication terminals. In the drawing only one such subscriber station SUB2 is shown in respect of the switching center SW1. Subscriber stations SUB2 and SUB2' are also shown in the drawing in respect of the switching centers SW2 and SWn, whereby the subscriber station SUB2 is shown with broken lines. It should be pointed out here that the sub-scriber station SUB2 was hitherto available at the switching center SW2 of the first communication network NET1 but is now available as the subscriber station SUB2' at the switching center SWn of the first communication network NET1.

The second communication network NET2, which may for example be a packet switching network, in which communication signals are transmitted as ATM signals or as IP signals, as for example in the internet and which may therefore be formed by an IP network, is only shown diagrammatically in the drawing.

As shown in the drawing, the switching centers SW1 to SWn of the first communication network NET1 are connected to the second communication network NET2 via the transition area TR mentioned above. Associated with this transition area TR are individual or separate transition devices MG1, MG2 to MGn, via which the switching centers SW1, SW2 to SWn of the first communication network NET1 are connected to the second communication network NET2. Also associated with the relevant transition area TR are control devices, such as MGC1 and MGC2, which are assigned to the transition devices MG1 or MG2, MGn mentioned just above and the switching centers SW1 or SW2, SWn of the first communication network NET1 and which are also connected to each other. These control devices, of which the drawing only shows the two control devices MGC1 and MGC2, are used to set up signaling connections between calling sub-scriber stations and subscriber stations to be called, the communication connections of which are then set up via the associated switching centers of the first communication network NET1, the transition device MG1 to MGn of the transition area TR and the second communication network NET2. The method stages thereby implemented are described in more detail below in relation to a call redirection situation in respect of a subscriber station to be called.

According to the invention a communication connection between a calling subscriber station, such as the sub-scriber station SUB1 shown in the drawing, which is linked to the switching center SW1 of the first communication network NET1, and a subscriber station to be called, which was hitherto available as subscriber station SUB2 at the switching center SW2 of the first communication network NET1, but which is now available at another switching center, namely the switching center SWn of the first communication network NET1 and which is referred to there as SUB2', is established after a signaling connection has first been set up. With regard to the subscriber station to be called, it should be noted that the subscriber station SUB2' should still be available at the call number which was dialed by the calling sub-scriber station SUB1 to establish a communication connection to the relevant subscriber station to be called.

The above-mentioned signaling connection is first set up from the calling subscriber station SUB1 via the switching center SW1 or via the control device SWC1 associated with this, then via the control device MGC1 of the transition area TR connected to this switching center SW1 and from the control device MGC1 to the control device MGC2, which is associated with the switching center SW2, at which the subscriber station SUB2 to be called was hitherto available. The second communication network NET2 is not included in this signaling connection.

During the course of the respective signaling connection control or signaling information comprising the call number of the respective calling subscriber station and the subscribing station to be called in each instance is stored in the control devices MGC1, MGC2 of the transition system. During the course of the signaling connection considered above, control or signaling information is sent from the control device MGC2 to the switching center SW2 of the first communication network NET1, at which the subscriber station SUB2 to be called was hitherto available. This subscriber station SUB2 to be called has left behind in the switching center SW2 its call redirection address or new address, i.e. the call number, at which the relevant subscriber station SUB2 to be called is now available, in the present case at another switching center of the first communication network NET1. In the example shown this is the switching center SWn of the first communication network NET1, in which the relevant subscriber station to be called is now available as SUB2'.

The control device MGC2 thereupon receives control or signaling information back from the switching center SW2, said information comprising the call number of the calling subscriber station (SUB1), the call number of the subscriber station to be called (SUB2) and the call redirection number (SUB2') of the relevant subscriber to be called. The control device MGC2 compares this information with the previously mentioned information stored in it relating to the calling subscriber station and the sub-scriber station to be called. From this comparison the control device MGC2 identifies that there is a call redirection situation, in other words that the required sub-scriber station SUB2 to be called is no longer available at the switching center SW2. The control device MGC2 also identifies from the relevant comparison where the required subscriber station to be called is now available. It then initiates, where necessary together with the above-mentioned control device MGC1, the setting up of a communication connection between the calling subscriber station SUB1 and the subscriber station SUB2' via the switching center SW1 of the first communication network, the transition device MG1 of the transition area TR, the second communication network NET2, the transition device MGn of the transition area TR and the switching center SWn, as the switching center at which the subscriber station SUB2 to be called is now available.

The procedure described above ensures that when a call redirection situation exists in respect of a subscriber station to be called, two switching centers of the first communication network NET1 and therefore only two transition devices, such as the transition devices MG1 and MGn in the example described, for a connection via the second communication network NET2, are included in the communication connection to be established between the calling subscriber station and the subscriber station to be called. Once different transmission procedures and formats have been established for communication signals in both communication networks NET1 and NET2, as mentioned above, a dual communication signal conversion is required even in the event of the call redirection situation described. Even in this case, the quality of the signal transmission is the same as in the case of a regular connection between a subscriber station linked to one switching center of the first communication network NET1 and a subscriber station to be called linked to another switching center of the same communication network NET1.

The signaling connection between the respective calling subscriber station and the subscriber station to be called in each instance can be processed in a corresponding manner to the communication connection between the relevant subscriber stations. This means, with regard to the exemplary embodiment according to the invention described above, that the signaling connection between the calling subscriber station SUB1 and the switching center SW2, at which the subscriber station SUB2 to be called was hitherto available, is in future no longer forwarded via this switching center SW2 after identification of the call redirection situation in respect of this subscriber station to be called but is sent directly from the control device MGC2 to the switching center SWn or received by said switching center, at which the subscriber station SUB2' to be called is now available.

In order to alleviate the load on the individual control devices of the switching system shown after termination of the respectively established connections, the control or signaling information stored in the control devices of the transition device involved in the respective connection is deleted after termination of the communication connection between the respectively connected subscriber stations. This ensures that information about currently existing connections is included in the relevant control devices.

In conclusion, it should also be pointed out that with the exemplary embodiment shown in the drawing the control device MGC2 is shown as a control device which is associated with both the switching centers SW2 and SWn of the first communication network NET1 and also the transition devices MG2 and MGn of the transition system TR, via which the relevant switching centers SW2, SWn are connected to the second communication network NET2. It may however also be clear that every switching center of the first communication network NET1 may be assigned a corresponding control device of the control area TR, via which the relevant switching center is connected to the second communication network NET2. In this case, the control and/or signaling information is transmitted correspondingly between the individual control devices as in the case of transmission between the control devices MGC1 and MGC2, so that the establishment of the communication connection required in each instance between the calling subscriber station and the subscriber station to be called operates practically as described above.

| List of reference characters | |
|---|---|
| IP network | Internet protocol network |
| MG1, MG2, MGn | Transition devices |
| MGC1, MGC2 | Control devices |
| NET1, NET2 | Communication networks |
| SUB1, SUB2, SUB2' | Subscriber stations |
| SW1, SW2, SWn | Switching centers |
| SWC1, SWC2, SWCn | Control devices |
| TR | Transition area |

The invention claimed is:

1. A method for establishing a communication connection between calling subscriber stations and subscriber stations to be called, comprising:

linking the subscriber stations to switching centers of a first communication network;

connecting the switching centers to each other by transition devices through a second communication network;

assigning to the transition devices separate control devices, which control connection traffic via the transition devices assigned respectively thereto; and storing in a first of the switching centers for a first subscriber station, which is to be called and which is at the first switching center, call redirection to a second subscriber station at a second of the switching centers;

storing during a singling connection to the first subscriber station a first control and/or signaling information element, which comprises a first call numbers of the calling subscriber stations and a second call number of the first subscriber station in the control devices, which are included in the signaling connections;

receiving in a first of the control devices a second control and/or signaling information element, which gives information about the second switching center at which the second subscriber station is available, whereby the second control and/or signaling information element is supplied by the first switching center, which is connected to the first control device and at which the first subscriber station was available;

in the first control device identifying existence of a call redirection situation from a comparison of the first and second control or signaling information elements; and setting up the communication connection directly to the second switching center from the first control device using the second control and/or signaling information element via the transition device, which connects the second switching center to the second communication network.

2. The method according to claim 1, wherein the signaling connection between a third of the switching centers to which the calling subscriber station is linked, and the first switching center at which the first subscriber station to be called was available, is effected via control devices, which are connected to the relevant switching centers and the transition devices connected thereto and which are connected to each other.

3. The method according to claim 1, wherein the signaling connection between the calling subscriber station and the first subscriber station to be called is processes in a corresponding manner to the communication connection between the subscriber stations.

4. The method according to claim 1, wherein the control or signaling information elements stored in the control devices of the transition devices involved in the connection are deleted after termination of the communication connection between the connected subscriber stations.

* * * * *